US009436753B2

(12) United States Patent
Shim et al.

(10) Patent No.: US 9,436,753 B2
(45) Date of Patent: Sep. 6, 2016

(54) METHOD AND APPARATUS FOR MANAGING UPDATE INFORMATION IN CHANNEL

(75) Inventors: Jung-hyun Shim, Seongnam-si (KR); Won-young Choi, Suwon-si (KR); Kuk-hyun Han, Daejeon (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/211,792

(22) Filed: Aug. 17, 2011

(65) Prior Publication Data

US 2012/0047441 A1 Feb. 23, 2012

(30) Foreign Application Priority Data

Aug. 17, 2010 (KR) ........................ 10-2010-0079284

(51) Int. Cl.
*G06F 17/30* (2006.01)
*H04M 1/725* (2006.01)
*G06Q 50/00* (2012.01)

(52) U.S. Cl.
CPC .... *G06F 17/30598* (2013.01); *H04M 1/72522* (2013.01); *H04M 1/72552* (2013.01); *G06F 2203/04803* (2013.01); *G06Q 50/01* (2013.01); *H04M 1/72561* (2013.01)

(58) Field of Classification Search
CPC ................ H04M 1/72552; H04M 1/72561; G06F 2203/04803; G06F 17/30598; G06Q 50/01
USPC .......................... 715/738, 808, 835; 705/26.1
See application file for complete search history.

(56) References Cited

U.S. PATENT DOCUMENTS

| 7,856,257 | B2 | 12/2010 | Haru et al. |
| 8,219,931 | B2* | 7/2012 | Hsieh et al. .................. 715/835 |
| 8,441,004 | B2 | 5/2013 | Fehrer et al. |
| 2004/0080538 | A1* | 4/2004 | Jollis ............................ 345/772 |
| 2004/0192440 | A1 | 9/2004 | Evans et al. |
| 2004/0244038 | A1* | 12/2004 | Utsuki ................ G11B 27/105 725/46 |
| 2007/0033584 | A1 | 2/2007 | Yu |
| 2009/0249247 | A1* | 10/2009 | Tseng et al. .................. 715/808 |
| 2009/0305687 | A1 | 12/2009 | Baldan |
| 2009/0307105 | A1 | 12/2009 | Lemay et al. |
| 2011/0252375 | A1* | 10/2011 | Chaudhri ...................... 715/835 |
| 2011/0260964 | A1* | 10/2011 | Mujkic .......................... 345/156 |
| 2014/0189675 | A1 | 7/2014 | Cheng et al. |

FOREIGN PATENT DOCUMENTS

CN 101816080 8/2010
JP 10-91407 4/1998
(Continued)

OTHER PUBLICATIONS

Japanese Office Action dated Jan. 28, 2014 issued in counterpart application No. 2013-524780.
(Continued)

*Primary Examiner* — Li Sun
(74) *Attorney, Agent, or Firm* — The Farrell Law Firm, P.C.

(57) ABSTRACT

An update management method and apparatus therefor are provided, the update management method including the operations of storing one or more pieces of update information related to at least one channel from a plurality of channels in a storage unit of a user terminal; and displaying the one or more pieces of update information in the related at least one channel.

22 Claims, 11 Drawing Sheets

(56) References Cited

FOREIGN PATENT DOCUMENTS

| JP | 2009-187216 | 8/2009 |
|----|----|----|
| JP | 2011-516936 | 5/2011 |
| WO | WO 2007/023585 | 3/2007 |
| WO | WO 2009/097555 | 8/2009 |
| WO | WO 2009/148781 | 12/2009 |
| WO | WO 2010/024986 | 3/2010 |

OTHER PUBLICATIONS

Mexican Office Action dated Jan. 30, 2014 issued in counterpart application No. MX/a/2013/001584.
Mexican Office Action dated Aug. 14, 2013 issued in counterpart application No. MX/a/2013/001584.
Austrailian Office Action dated Nov. 11, 2013 issued in counterpart application No. 2011292829.
European Search Report dated Jan. 8, 2014 issued in counterpart application No. 13187531.2-1858.
European Search Report dated Jan. 8, 2014 issued in counterpart application No. 11818350.8-1858.
Mexican Office Action dated Apr. 11, 2014 issued in counterpart application No. MX/a/2013/001584.
Japanese Office Action dated Feb. 23, 2015 issued in counterpart application No. 2013-524780.
Chinese Office Action dated Apr. 28, 2015 issued in counterpart application No. 201180050097.1.

* cited by examiner

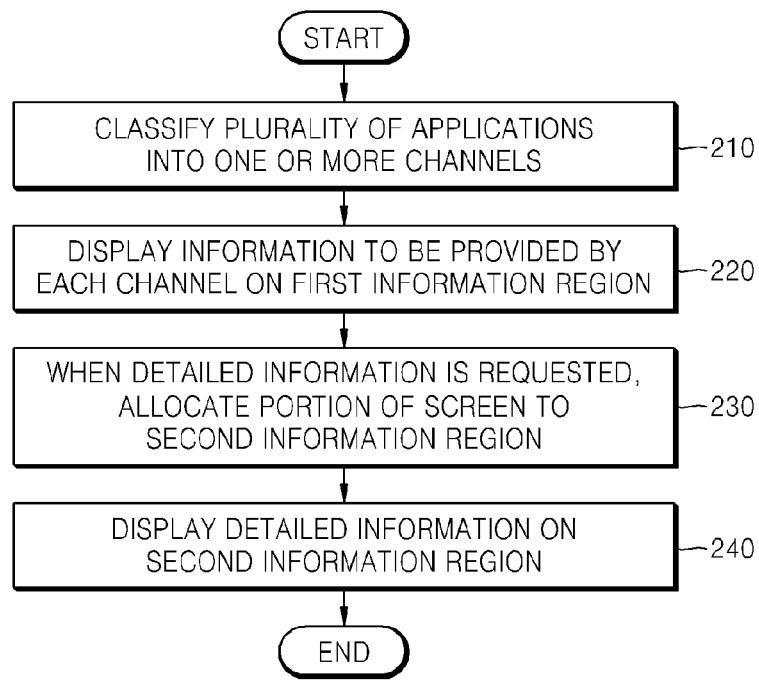
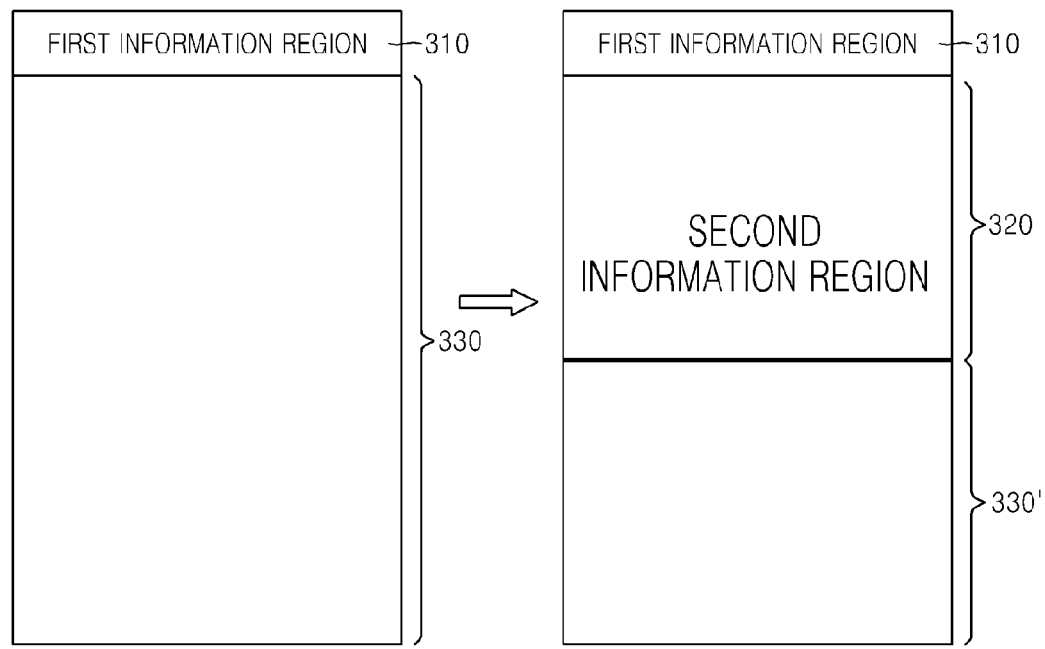

METHOD AND APPARATUS FOR MANAGING UPDATE INFORMATION IN CHANNEL

PRIORITY

This application claims priority under 35 U.S.C. §119(a) to Korean Patent Application No. 10-2010-0079284, filed on Aug. 17, 2010 in the Korean Intellectual Property Office, the entire disclosure of which is incorporated herein by reference.

BACKGROUND OF THE INVENTION

1. Field of the Invention

The present invention relates generally to a method of providing information to a user via a user device, and more particularly, to an update management method and apparatus for providing update information to a user.

2. Description of the Related Art

Recently, the volume and types of applications for mobile devices have increased. In order to check for new update information or new information regarding applications, a user generally repeats a procedure in which the user executes an application, enters a display menu screen, and ends the application, and then executes a second application and ends the second application and so on. Because the procedure is inconvenient to the user, there is a need for a method by which users may easily and conveniently access update information.

SUMMARY OF THE INVENTION

According to an aspect of the present invention, an update management method is provided, including storing one or more pieces of update information related to at least one channel from a plurality of channels in a storage unit of a user terminal; and displaying the one or more pieces of update information in the related at least one channel.

According to another aspect of the present invention, there is provided an update management apparatus including a storage unit for storing one or more pieces of update information related to at least one channel from a plurality of channels; a display unit for displaying the one or more pieces of update information; and a control unit for controlling the display unit to display the one or more pieces of update information, which are stored in the storage unit, in the related at least one channel.

BRIEF DESCRIPTION OF THE DRAWINGS

The above and other features and advantages of the present invention will become more apparent by describing in detail embodiments thereof with reference to the attached drawings, in which:

FIG. 4 is a flowchart illustrating an update management method, according to another embodiment of the present invention;

FIG. 5 illustrates a screen in which a first information region and a second information region are displayed;

DETAILED DESCRIPTION OF EMBODIMENTS OF THE PRESENT INVENTION

Hereinafter, the present invention will be described in detail by explaining illustrative embodiments of the invention with reference to the attached drawings.

As used herein, the term "and/or" includes any and all combinations of one or more of the associated listed items.

Figure 1:
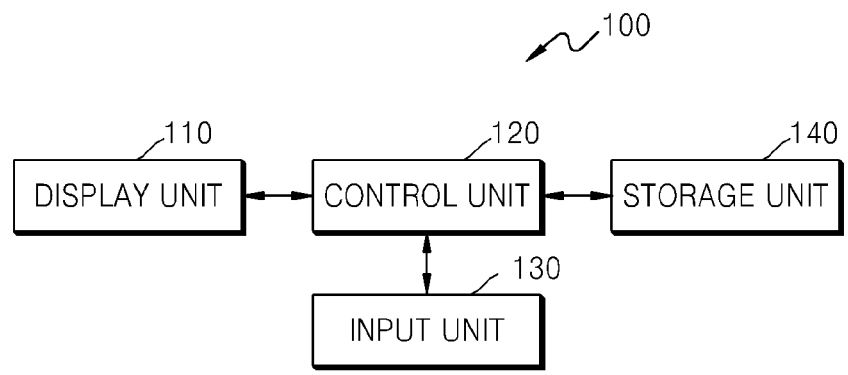
FIG. 1 is a block diagram illustrating an update management apparatus according to an embodiment of the present invention.

FIG. 1 is a block diagram illustrating an update management apparatus 100 according to an embodiment of the present invention.

Referring to FIG. 1, the update management apparatus 100 is a user terminal that includes a display unit 110 including a screen for inputting information; an input unit 130 for receiving user input; a storage unit 140 for storing update information; and a control unit 120 for processing an input via the input unit 130 and controlling the display unit 110 to output the update information. A plurality of pieces of update information are provided by the update management apparatus 100 via one or more channels related to the plurality of pieces of update information, respectively. The channels may be defined as categories that are classified according to characteristics of the update information or characteristics of applications installed in the update management apparatus 100. However, the channels are not limited thereto, and may be classified according to other standards. The update information may be new information, new content, or recommended content, which are provided from external sources.

The display unit 110 and the input unit 130 may be implemented as a touch screen capable of detecting the presence and position of a touch on a display region. The storage unit 140 stores one or more pieces of update information related to at least one channel from the plurality of channels. The control unit 120 controls the display unit 110 to display the one or more pieces of update information via a corresponding channel.

Figure 2:
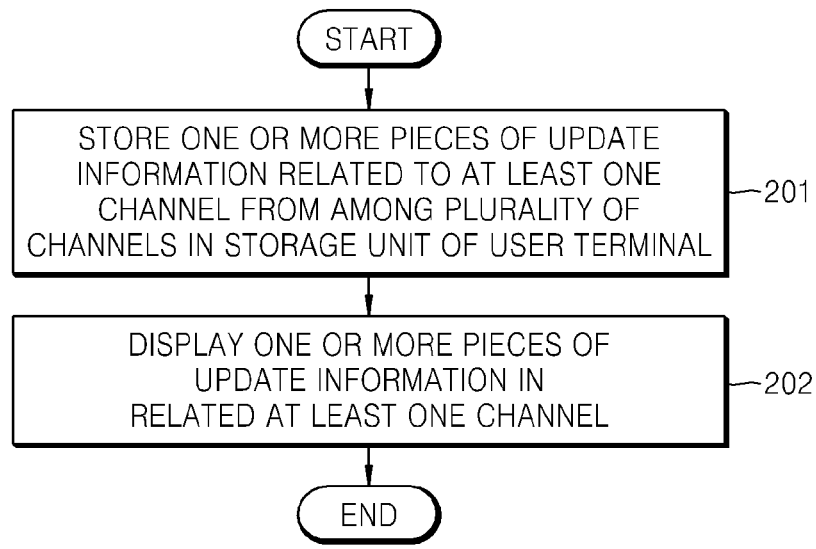
FIG. 2 is a flowchart illustrating an update management method according to an embodiment of the present invention.

FIG. 2 is a flowchart illustrating an update management method according to an embodiment of the present invention.

Referring to FIG. 2, first, in step 201, one or more pieces of update information related to at least one channel from a plurality of channels are stored in the storage unit 140 of the update management apparatus 100 (the user terminal). The update information may include data received from network resources including a Social Network Service (SNS), an email, or the like. In step 202, the stored one or more pieces of update information are displayed via related one or more channels, respectively. The update information may include a link to a resource that provides related data. For example, the update information may include a network address such as a Uniform Resource Locator (URL) of the related data. When the link of the update information displayed via the channel is selected, the related data may be received from the corresponding resource and may then be provided to a user via the channel.

Figure 3:
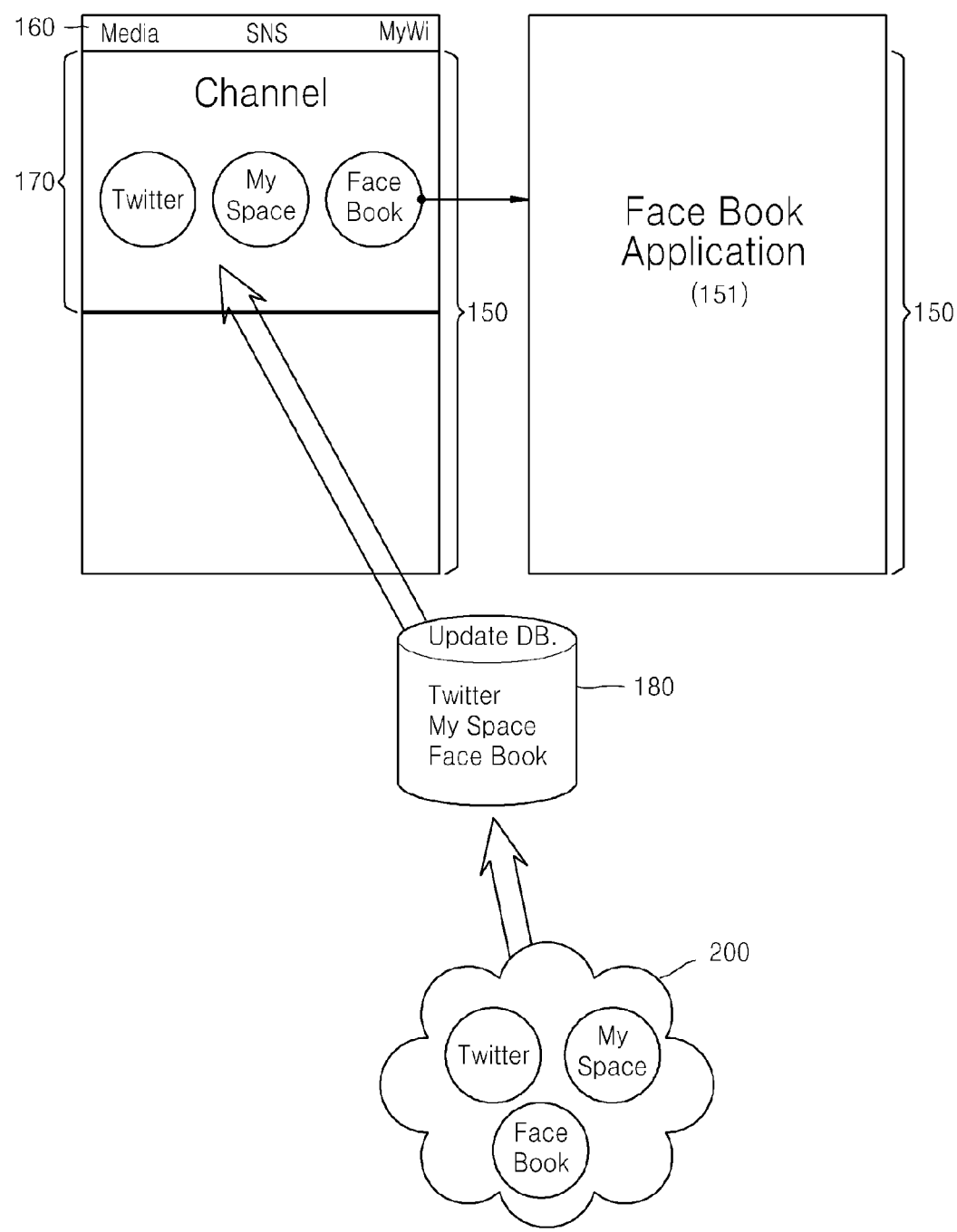
FIG. 3 illustrates an example of a connection relationship between an update management screen and an information resource.

FIG. 3 illustrates a connection relationship between an update management screen and an information resource.

Referring to FIG. 3, when update information is input to a user terminal from a service provider server in a network 200 such as the Internet, a mobile communication network, or the like, the update information is stored in an update database 180 of the storage unit 140. In the example of FIG. 3, a plurality of pieces of update information related to three applications including TWITTER®, MYSPACE®, and FACEBOOK® are received and stored in the update database 180 of the storage unit 140. A plurality of channels including a Media channel, an SNS channel, and a My Widget channel are provided to a user in the user terminal, the plurality of pieces of update information are displayed via the SNS channel, which is related to the plurality of pieces of update information and that is from the channels.

A channel region 170 of a screen 150, on which update information of a predetermined channel is displayed, may be a channel browser or a channel browsing area capable of displaying one piece of update information or a plurality of pieces of update information at one time. In a case in which the plurality of pieces of update information are displayed or one or more pieces of update information are displayed via a plurality of pages, the channel region 170 is a region where update information of a current channel may be browsed and selected according to a user input via the input unit 130. A method of displaying update information via a channel is not limited to one specific method and may involve displaying a preview with respect to each update information, may involve showing corresponding update information by executing an application related to each update information, or may involve displaying an application related to each update information or displaying information related to the application. When a user selects desired update information in the current channel, an application 151 related to the selected update information is executed.

Moreover, at least one piece of notice information notifying a user of the existence of at least one piece of update information may be displayed, and the notice information may be displayed on a ticker region 160 that is a separate screen region from the channel region 170. The notice information may be displayed while scrolling in the left and right directions or up and down directions, or may be displayed in a fade-in and fade-out manner, but the manner of display is not limited thereto. The notice information may include a title, a generator, a summary, and the like with respect to corresponding update information. Further, a plurality of pieces of notice information may be sequentially displayed on the ticker region 160 in an order according to channels.

For example, when a new topic is updated to a TWITTER® account of a user, information corresponding to the topic is received and is stored in the update database 180 as update information, and notice information notifying the user of the update information is displayed on the ticker region 160. When the user selects the notice information, an SNS channel to which the update information belongs is opened, and the new topic that is updated to the TWITTER® account of the user is displayed on the channel region 170. As illustrated in FIG. 3, after a channel is opened, a channel list that has information relating to a switch between channels may be displayed on the ticker region 160. If the user selects a Media channel, update information of the Media channel will be displayed on the channel region 170.

FIG. 4 is a flowchart illustrating an update management method according to another embodiment of the present invention. FIG. 5 illustrates a screen divided into a first information region 310 and a second information region 320.

Referring to FIGS. 4 and 5, in step 210, a plurality of applications that are available in the update management apparatus 100 are classified into one or more channels. A standard of channel classification may depend on the types of information that are provided by the applications but is not limited thereto. The screen includes the first information region 310, and, in step 220, information to be provided by each channel is displayed on the first information region 310. The information to be provided by each channel may be update information such as new content or recommend content that is related to applications included in each channel. A size of the first information region 310 is limited so that information displayed on the first information region 310 may be text-based core information including a title of content or notice of information occurrence, or may be summary information.

When an input requesting detailed information regarding the information displayed on the first information region 310 is received, a portion of the screen other than the first information region 310 is allocated as the second information region 320. Due to the allocation of the second information region 320, information that is displayed on a main region 330 of the screen, or an application that is executed on the main region 330 is re-displayed on a region 330' that is divided and becomes smaller. The detailed information requested by a user, that is, the detailed information corresponding to the information displayed on the first information region 310 is then displayed on the second information region 320. In the present embodiment, the first information region 310 may continuously exist on the screen, and the second information region 320 may be retrieved by the user. A size of the second information region 320 may vary according to an amount of information to be provided. Moreover, the size of the second information region 320 may be adjusted according to a user request.

Figure 6:
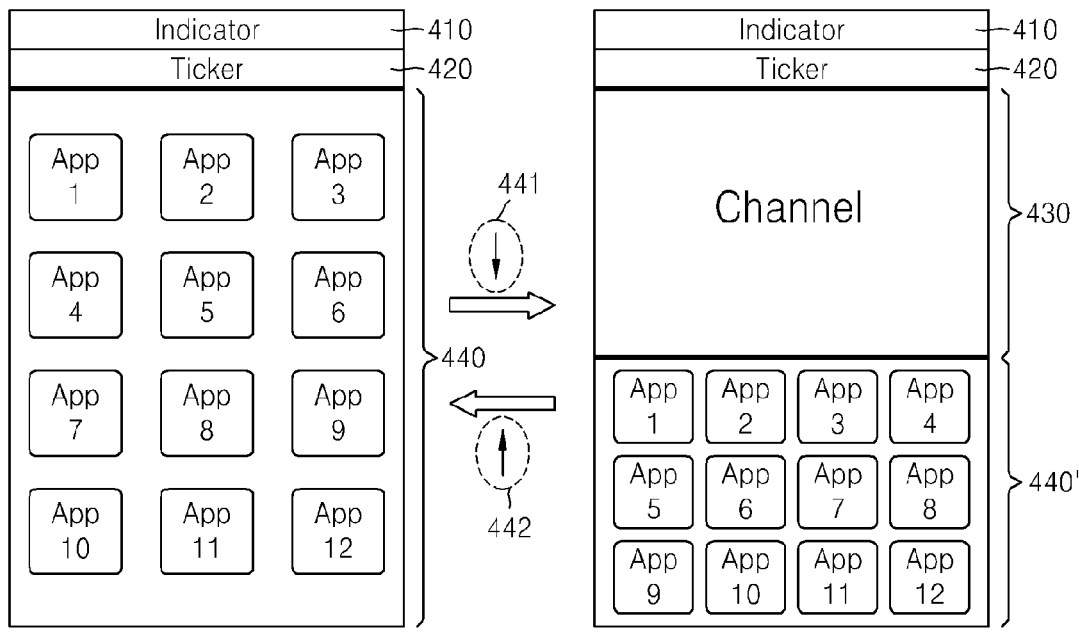
FIG. 6 illustrates a screen in which a channel is opened so as to provide update information.

FIG. 6 illustrates a screen in which a channel is opened so as to provide update information.

Referring to FIG. 6, an indicator region 410 for displaying information including a battery capacity of the update management apparatus 100, and a ticker region 420 corresponding to the first information region 310 are on an upper portion of the screen, and a main region 440 of the screen is used for a menu page including menu icons corresponding to applications, respectively. The ticker region 420 exists although another application other than the menu page is executed in the main region 440, and constantly informs a user of new information. As FIG. 6 illustrates, the ticker region 420 is shown on the upper portion of the screen but may also be on another part of the screen.

When a flick input 441 regarding a flick in a downward direction of the ticker region 420 is input, a channel region 430 corresponding to the second information region 320 is opened, and update information corresponding to notice information displayed on the ticker region 420 is shown in detail. For example, in a case in which a title of new content related to a moving picture reproducing application is displayed on the ticker region 420, a preview of the new content is displayed on the channel region 430, and in a case in which information indicating a reception notice of a new text message is displayed on the ticker region 420, the substance of the received text message is provided on the channel region 430. The channel region 430 is not usually shown on the screen but may be retrieved at any time. Thus, a user occasionally checks new information via the ticker region 420, and if there is interesting information, the user may read detailed information or corresponding content by opening the channel region 430.

Because a portion of the main region 440 is allocated as the channel region 430, a menu page is re-allocated to a menu region 440' that is divided and becomes small. Moreover, when an input corresponding to a request of a menu search is received, a menu search command corresponding to the input is performed in the menu region 440' that is small. When a flick input 442 regarding a flick in an upward direction of the channel region 430 is received, the channel region 430 is closed, and an entire region of the main region 440 is allocated to the menu page. In order to open or close the channel region 430, methods other than the flick may be used.

Figure 7:
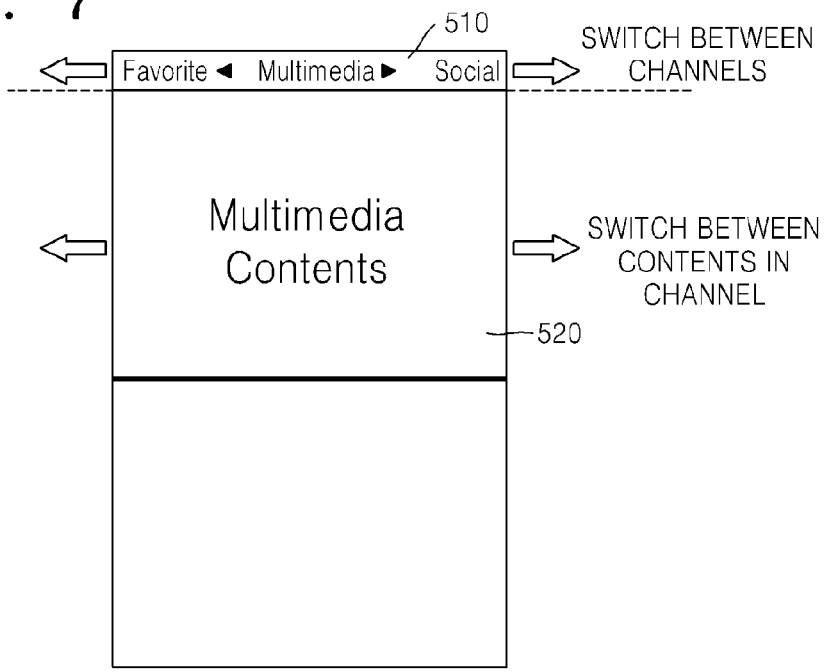
FIG. 7 illustrates a screen in which a channel is switched, and update information in the channel is browsed.

FIG. 7 illustrates a screen in which a channel is switched, and update information in the channel is browsed.

Referring to FIG. 7, channels titled "Favorite", "Multimedia", and "Social" are displayed in a ticker region 510, a channel that is currently open is "Multimedia", and a switch to a previous channel "Favorite" or a next channel "Social" may be performed. A switch between channels may be available via a predetermined input including a tap, a flick, or the like. Multimedia content corresponding to new content information is displayed in a channel region 520, wherein the new content information is displayed in the ticker region 510 when the channel is opened. In the channel region 520, a switch between content in the same channel is available according to a predetermined input such as a flick. For example, previews of multimedia content recommended in a multimedia content channel may be sequentially displayed. After the channel region 520 is opened, as illustrated in FIG. 7, a channel list may be displayed in the ticker region 510. By using a structure of the screen, a user may view information of all channels on one screen, and a service provider may constantly recommend new content to the user by using a recommendation engine.

Figure 8:
FIG. 8 illustrates a configuration of update information.
Figure 9:
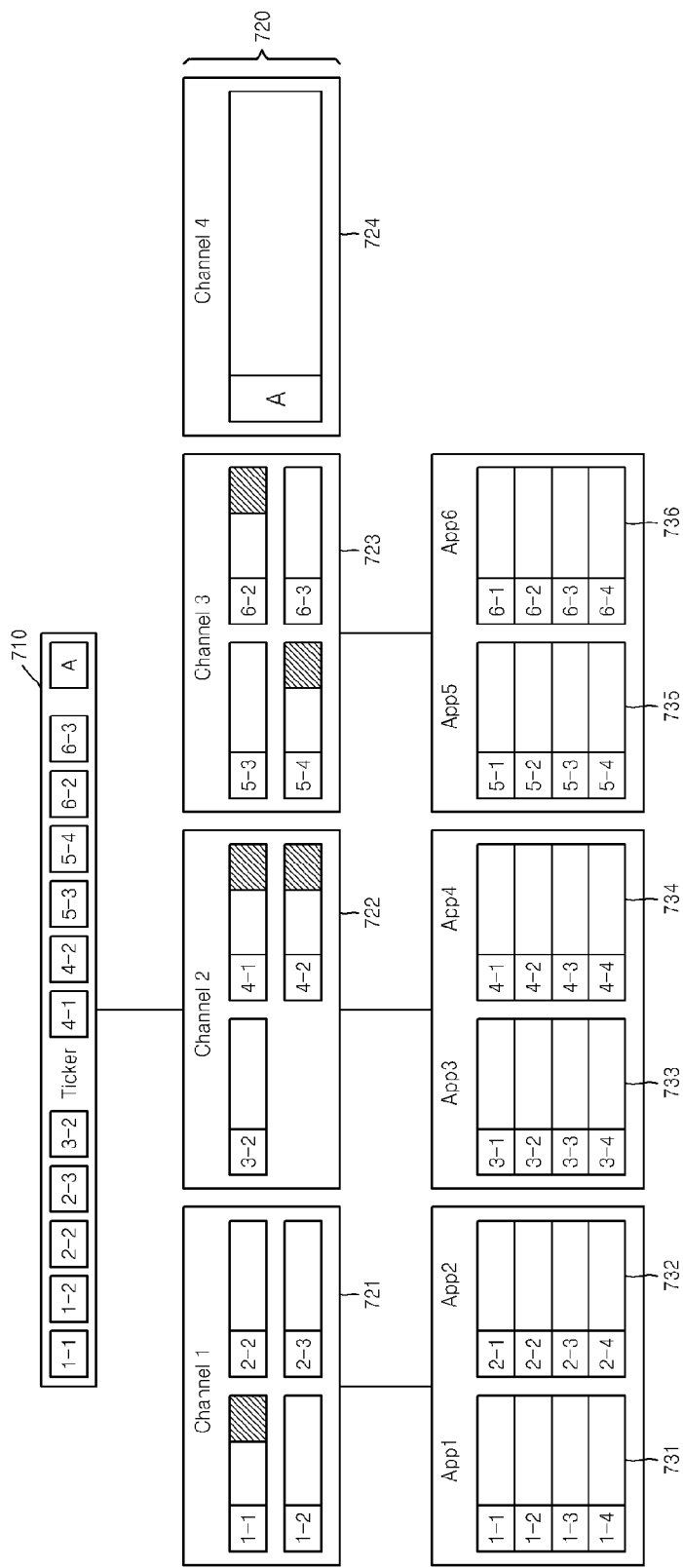
FIG. 9 illustrates a structure of a channel.

FIG. 8 illustrates a configuration of update information, and FIG. 9 illustrates a structure of a channel.

Referring to FIG. 8, in the present embodiment, the update information provided to a user includes a title, a header region 610 including summary information and/or core information, and a data region 620 including detailed information and/or a content main body. Referring to FIGS. 8 and 9, information included in the header region 610 of the update information is provided as notice information via a ticker 710, and information of the data region 620, which corresponds to the notice information displayed on the ticker 710, is provided with the information of the header region 610 via a channel 720.

Referring to FIG. 9, 6 applications, namely, App1 through App6 731 through 736 are available, and, App1 731 has 4 pieces of update information including headers 1-1 through 1-4, and each of App2 through App6 732 through 736 has 4 pieces of update information. The App1 731 and the App2 732 are classified into a channel1 721, the App3 733 and the App4 734 are classified into a channel2 722, and the App5 735 and the App6 736 are classified into a channel3 723. The channel1 721 has 4 pieces of update information received including headers 1-1, 1-2, 2-2, and 2-3, the channel2 722 has 3 pieces of update information received including headers 3-2, 4-1, and 4-2, and the channel3 723 has 4 pieces of update information received including headers 5-3, 5-4, 6-2, and 6-3. The shaded diagonal line portion in the update information 1-1 shows that information is partially displayed on a channel region and thus further information exists.

A channel4 724 may be used to provide a user with information generated unrelated to an application. The channel4 724 is an additional channel. For example, when a user who has the update management apparatus 100 goes to a specific place or approaches a specific position, if it is necessary to inform the user of information received from an external source, the channel4 724 is used. When the channel4 724 has information to be provided to the user, the user is informed of the information via the ticker 710, and detailed information is provided to the user via the channel 720.

Figure 10:
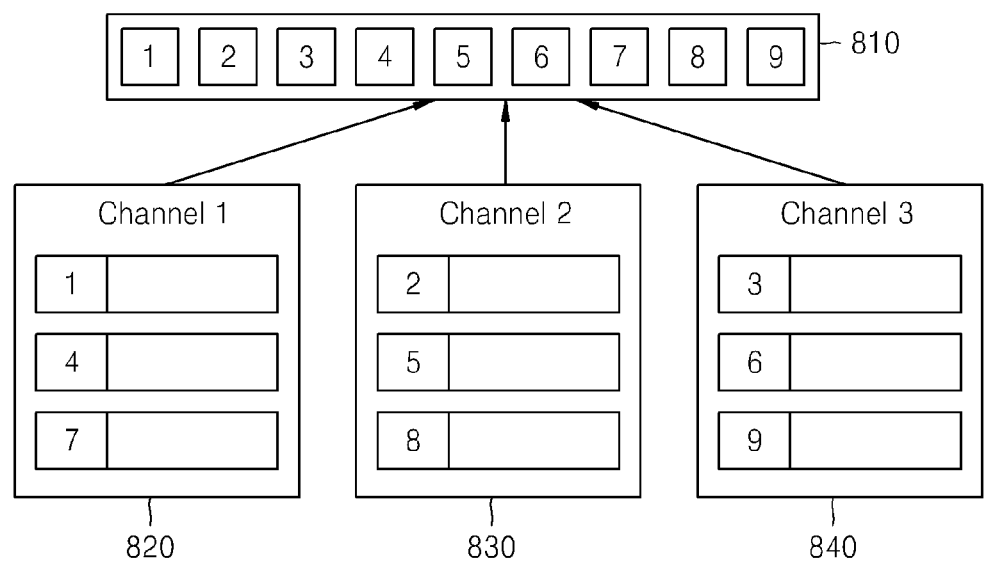
FIG. 10 illustrates an order for displaying a plurality of pieces of information on a ticker.

FIG. 10 illustrates an order of displaying a plurality of pieces of information on a ticker.

Referring to FIG. 10, each of a channel1 820, a channel2 830, and a channel3 840 has 3 pieces of update information, and a plurality of pieces of notice information regarding the 3 pieces of update information of each channel are displayed on a ticker region 810 according to a predetermined order and period. For example, in order to sequentially provide the plurality of pieces of notice information regarding the 3 pieces of update information of each channel, the update information1 of the channel1 820, the update information2 of the channel2 830, the update information3 of the channel3 840, the update information4 of the channel1 820, the update information5 of the channel2 830, the update information6 of the channel3 840, the update information7 of the channel1 820, the update information8 of the channel2 830 and the update information9 of the channel3 840 may sequentially be provided one by one while being updated every 4 seconds.

Figure 11:
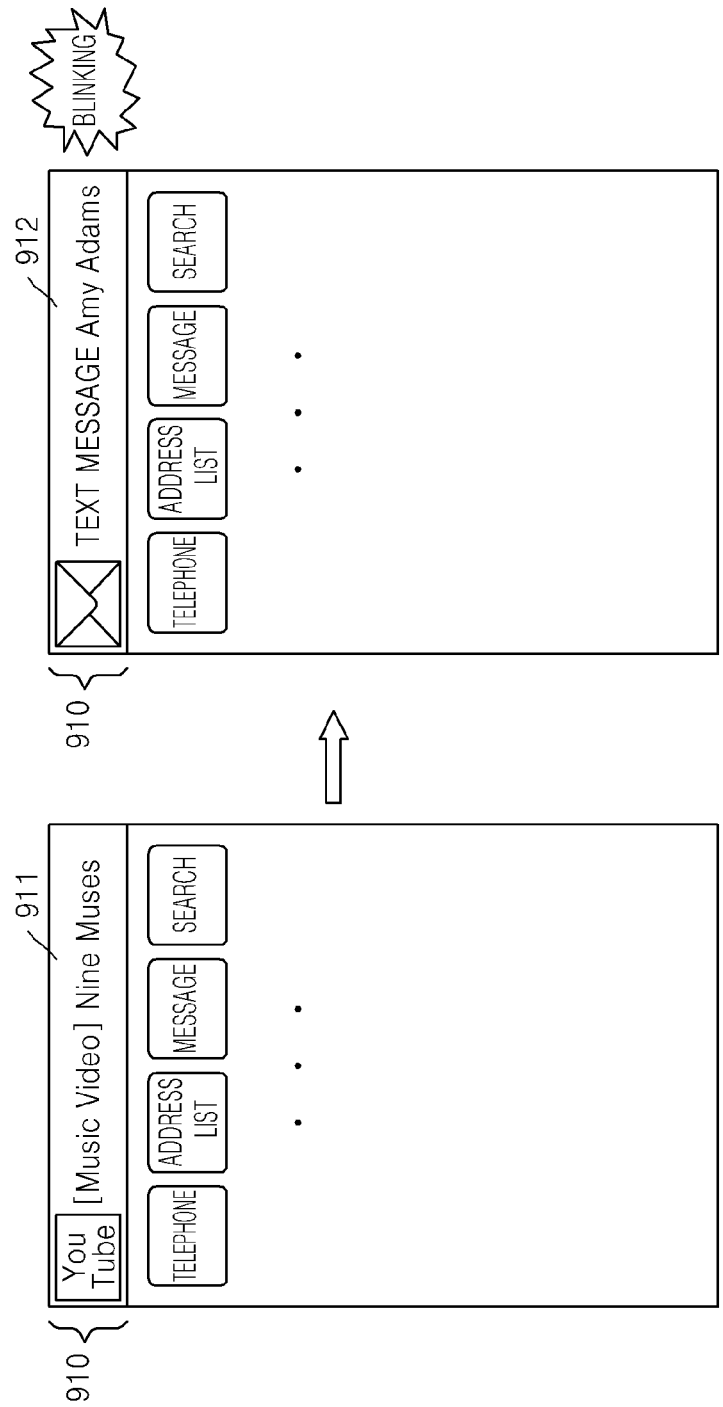
FIG. 11 illustrates a screen for displaying notice information on a ticker so as to inform a user of information.

FIG. 11 illustrates a screen for displaying notice information 911 on a ticker so as to inform a user of information.

Referring to FIG. 11, while the notice information 911 regarding update information is provided on a ticker region 910 according to an order of channels, if a user must be notified of update information 912 such as a text message, the update information 912 is displayed on the ticker region 910 according to priority. In order to draw the attention of the user, the update information 912 may be displayed using a different color from recommendation information or be blinking.

Figure 12:
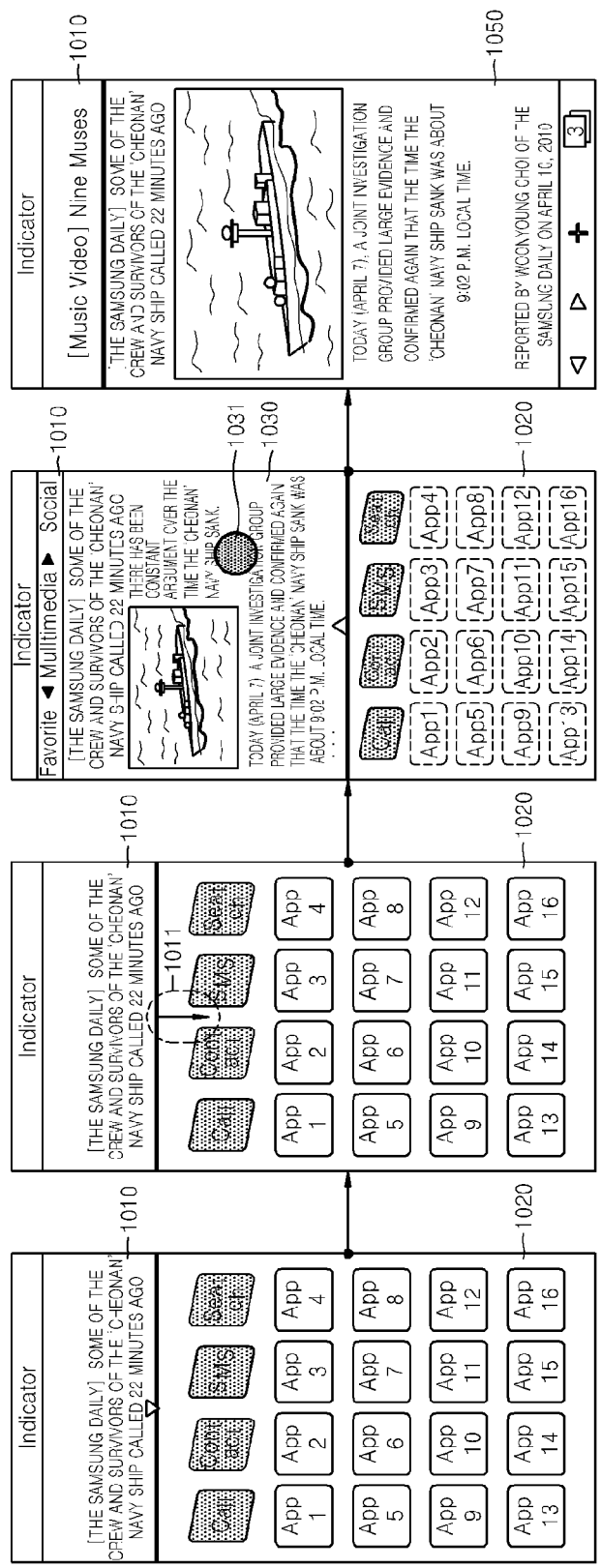
FIG. 12 illustrates a process for opening a channel in a menu screen.

FIG. 12 illustrates an example of a process for opening a channel in a menu screen.

Referring to FIG. 12, while a menu page 1020 is displayed in a main region, notice information regarding new content related to "the Samsung Daily" application in a "Multimedia" channel is provided on a ticker 1010. When a user interested in the new content executes an input 1011 of dropping down the ticker 1010, a channel 1030 is opened and detailed information regarding the new content is then displayed. What is displayed on the ticker 1010 is changed to a channel list. If the user wants to execute the "the Samsung Daily" application and read the entire corresponding article, the user may directly enter a corresponding application 1050 by executing a tap input 1031 in the channel 1030. The ticker 1010 may be converted to a status for periodically notifying the user of new content or recommended content of each channel.

If the user wants to view another new content informed by the ticker 1010 while the application 1050 is executed, the user may drop down the ticker 1010. In this case, a screen allocated to the execution of the application 1050 is divided, so that a channel is opened in an upper portion of the screen, and detailed information corresponding to the other new content is displayed. Then, the executed application 1050 is turned to an inactive state, only content of a lower portion are displayed on the screen, and when the channel is closed, the application 1050 is turned to an active state.

Figure 13:
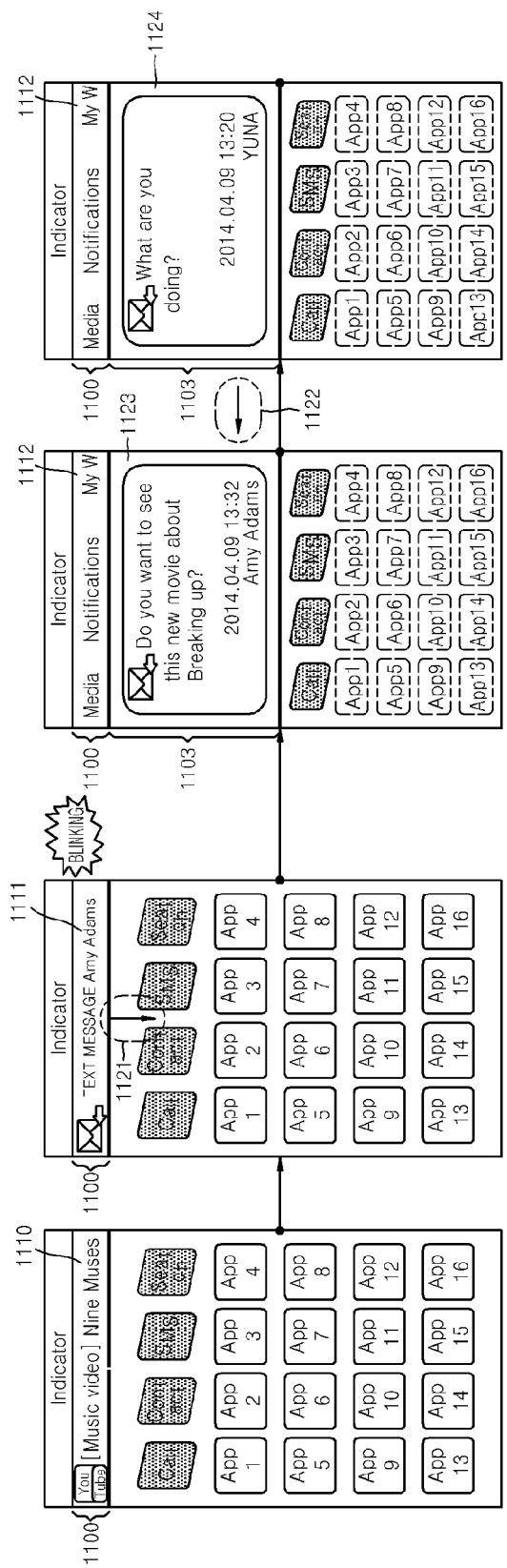
FIG. 13 illustrates a screen for informing a user of a text message via a ticker.

FIG. 13 illustrates a screen for informing a user of a text message via a ticker.

Referring to FIG. 13, when a new text message is received while notice information 1110 regarding update information is displayed on a ticker region 1100, content of the ticker region 1100 is changed to notice information 1111 regarding the text message. When an input 1121 requesting to drop down a ticker and to open a channel is received, a channel region 1103 is opened and a received text message 1123 is displayed. When a left flick input 1122 is received by the channel region 1103, a next text message 1124 is displayed on the channel region 1103. That is, it is possible to switch between content in the same channel.

Figure 14:
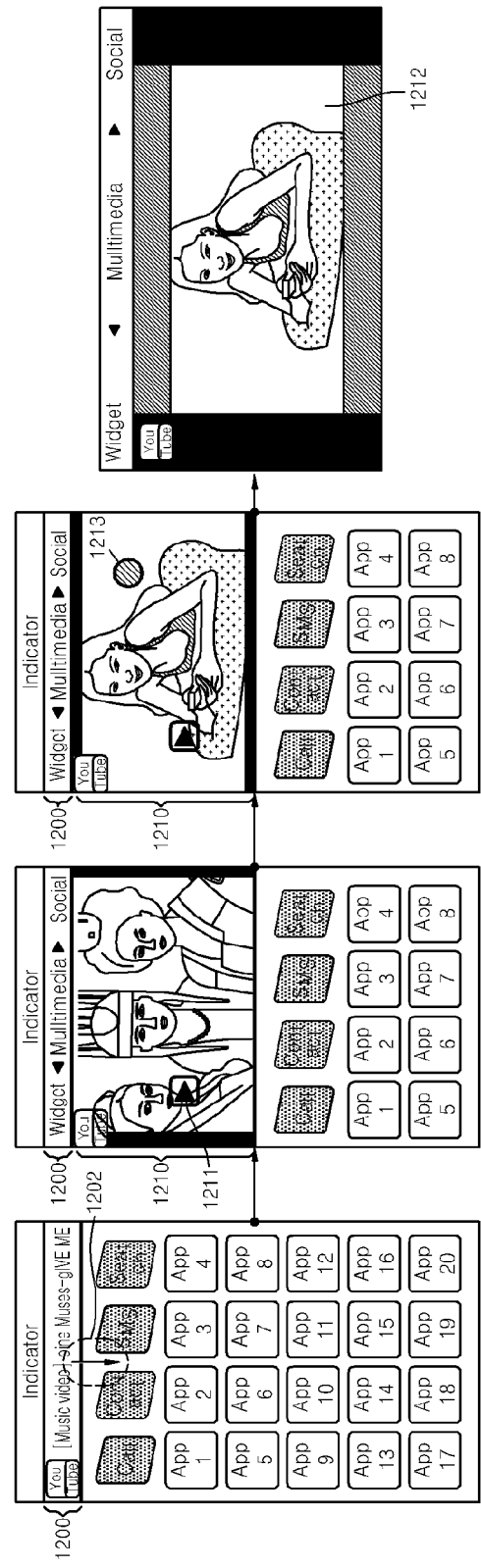
FIG. 14 illustrates a screen for displaying multimedia content recommended via a ticker.

FIG. 14 illustrates a screen for displaying multimedia content recommended via a ticker.

Referring to FIG. 14, when a flick input 1202 is received so as to view detailed information with respect to recommended moving picture content displayed on a ticker region 1200, a portion of the screen is allocated as a channel region 1210, and then a still image for a preview of the moving picture content is displayed. If an auto-slide function is set, still images previewing other moving picture content in the same channel are displayed according to a predetermined periodic order. When a predetermined icon 1211 of the channel region 1210 is selected by using a tap input or the like, the current moving picture content is shown. The moving picture content for the preview is reproduced, and it is possible to switch to a screen for reproducing moving picture content to preview other moving picture content in the same channel, according to a predetermined periodic order. When a portion 1213 of the channel region 1210 other than the predetermined icon 1211 is selected or tapped, a corresponding application is executed. Further, when the update management apparatus 100 is moved in a horizontal direction, channel information may be displayed on a full screen 1212. In a full screen mode, the update management apparatus 100 may be control the display of moving picture content.

Figure 15:
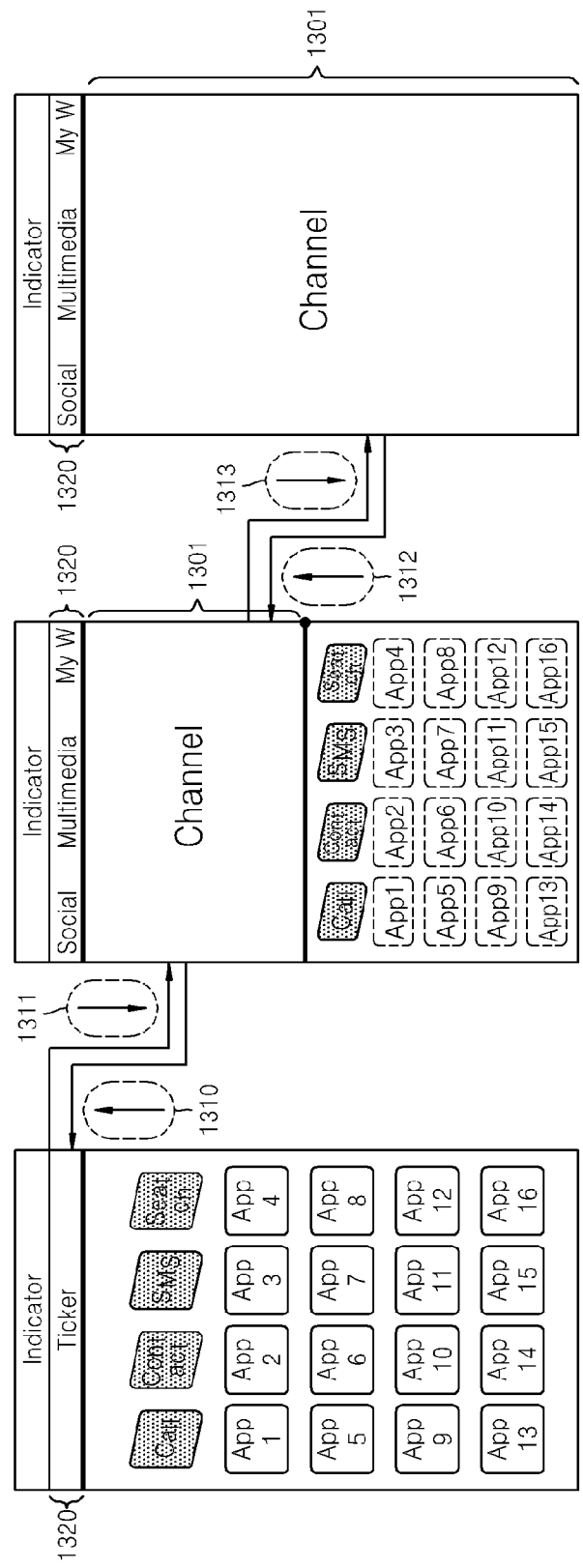
FIG. 15 illustrates a screen in which a size of a channel region is adjusted.

FIG. 15 illustrates a screen in which a size of a channel region 1301 is adjusted.

Referring to FIG. 15, the channel region 1301 may be opened via an input 1311 for dropping down a ticker 1320, and when an input 1310 for closing the channel region 1301 is received, the channel region 1301 disappears. A size of the channel region 1301 may be determined according to an amount of information to be displayed, and may be adjusted according to additional inputs 1312 and 1313 of the user.

The invention can also be embodied as computer-readable codes on a computer-readable recording medium. The computer-readable recording medium is any data storage device that can store data that can be thereafter read by a computer system. Examples of the computer-readable recording medium include Read-Only Memory (ROM), Random-Access Memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While this invention has been particularly shown and described with reference to embodiments thereof, it will be understood by those of ordinary skill in the art that various changes in form and details may be made therein without departing from the spirit and scope of the invention as defined by the appended claims and their equivalents.

What is claimed is:

1. A method for providing information by a device, the method comprising:
    defining a plurality of categories, wherein each of the plurality of categories concerns a type of information and contains a plurality of applications;
    in response to a plurality of update events, displaying aggregated notice information indicating that detailed update information is received on a first display region, wherein the aggregated notice information comprises a plurality of individual notice information, and wherein each of the plurality of individual notice information corresponds to an application;
    in response to user selecting one of the plurality of individual notice information, displaying detailed update information regarding an application the individual notice information corresponds to on a second display region, and simultaneously displaying a category the application belongs to and a mechanism for switching among the plurality of categories on the first display region, wherein detailed update information regarding another application in the same category is displayed on the second region in response to user interaction on the second display region;
    receiving an input indicating a switch between the category and another of the plurality of categories on the first display region; and
    in response to the switching, displaying detailed update information regarding an application that belongs to the another of the plurality of categories on the second display region.

2. The method of claim 1, wherein the displaying the detailed update information comprises:
    displaying the detailed update information by executing an application related to the detailed update information.

3. The method of claim 1, further comprising:
    when the detailed update information is selected, executing an application that is related to the selected detailed update information.

4. The method of claim 1, wherein the displaying the detailed update information comprises:
    displaying a preview regarding the detailed update information on the second display region.

5. The method of claim 1, wherein the aggregated notice information is displayed in a scrolling manner.

6. The method of claim 1, further comprising:
    displaying a category list on the first display region;
    wherein the receiving of the input indicating the switch between the category and the another of the plurality of categories is performed based on the category list.

7. The method of claim 1, wherein the displaying the category the corresponding application belongs to and the mechanism for switching among the plurality of categories comprises:
    displaying the plurality of categories according to a sequential order of categories.

8. The method of claim 1, wherein the detailed update information comprises:

one or more links regarding one or more resources that provide related data.

9. The method of claim 1, wherein the detailed update information comprises:
data received from a network resource.

10. The method of claim 1, wherein the first display region includes a category browsing area.

11. The method of claim 1, further comprising:
displaying a plurality of categories on the first display region when receiving the selection of the individual notice information.

12. A non-transitory computer-readable recording medium having recorded thereon a program for executing an information providing method, the information providing method comprising:
defining a plurality of categories, wherein each of the plurality of categories concerns a type of information and contains a plurality of applications;
in response to a plurality of update events, displaying aggregated notice information indicating that detailed update information is received on a first display region, wherein the aggregated notice information comprises a plurality of individual notice information, and wherein each of the plurality of individual notice information corresponds to an application;
in response to user selecting one of the plurality of individual notice information, displaying detailed update information regarding an application the individual notice information corresponds to on a second display region, and simultaneously displaying a category the application belongs to and a mechanism for switching among the plurality of categories on the first display region, wherein detailed update information regarding another application in the same category is displayed on the second region in response to user interaction on the second display region;
receiving an input indicating a switch between the category and another of the plurality of categories on the first display region; and
in response to the switching, displaying detailed update information regarding an application that belongs to the another of the plurality of categories on the second display region.

13. An information providing apparatus comprising:
a storage that stores detailed update information and a plurality of categories, wherein each of the plurality of categories concerns a type of information and contains a plurality of applications;
an input device that receives an input;
a display that displays, in response to a plurality of update events, aggregated notice information indicating that detailed update information is received on a first display region, wherein the aggregated notice information comprises a plurality of individual notice information, and wherein each of the plurality of individual notice information corresponds to an application, and displays, in response to user selecting one of the plurality of individual notice information, detailed update information regarding an application the individual notice information corresponds to on a second display region, and simultaneously displays a category the application belongs to and a mechanism for switching among the plurality of categories on the first display region, wherein detailed update information regarding another application in the same category is displayed on the second region in response to user interaction on the second display region; and
a processor that receives an input indicating a switch between the category and another of the plurality of categories on the first display region, and controls the storage and the display to display, in response to the switching, detailed update information regarding an application that belongs to the another of the plurality of categories on the second display region.

14. The information providing apparatus of claim 13, wherein the processor displays the update information by executing an application related to the detailed update information.

15. The information providing apparatus of claim 13, wherein, when the detailed update information is selected via the input device, the processor executes an application that is related to the detailed update information.

16. The information providing apparatus of claim 13, wherein the processor displays a preview regarding the detailed update information on the second display area.

17. The information providing apparatus of claim 13, wherein the detailed update information comprises:
one or more links regarding one or more resources that provide related data.

18. The information providing apparatus of claim 13, wherein the detailed update information comprises:
data received from a network resource.

19. A method for providing information by a device, the method comprising:
defining a plurality of categories, wherein each of the plurality of categories concerns a type of information and contains a plurality of applications;
in response to a plurality of update events, displaying aggregated notice information indicating that detailed update information is received on a first display region, wherein the aggregated notice information comprises a plurality of individual notice information, and wherein each of the plurality of individual notice information corresponds to an application;
in response to user selecting one of the plurality of individual notice information, displaying detailed update information regarding an application the individual notice information corresponds to on a second display region, and simultaneously displaying a category the application belongs to and a mechanism for switching among the plurality of categories on the first display region, wherein detailed update information regarding an application belongs to another of the plurality of categories is displayed on the second display region in response to user interaction with the mechanism for switching among the plurality of categories;
receiving an input indicating a switch between the detailed update information on the second display region; and
in response to the switching between the detailed update information, displaying detailed update information regarding another application in the same category on the second display region.

20. The method of claim 19, wherein the displaying the detailed update information comprises:
displaying the detailed update information by executing an application related to the detailed update information.

21. The method of claim 19, further comprising:
when the detailed update information is selected, executing an application that is related to the detailed update information.

22. The method of claim 19, wherein the displaying the detailed update information comprises:
   displaying a preview regarding the detailed update information.

* * * * *